(12) United States Patent
Barclay et al.

(10) Patent No.: US 8,994,710 B2
(45) Date of Patent: Mar. 31, 2015

(54) ELECTRONIC DOCUMENT READING DEVICE

(75) Inventors: Duncan Barclay, Cambridge (GB); Steven Farmer, Cambridge (GB)

(73) Assignee: Flexenable Limited, Cambridge, Cambridgeshire (GB)

( * ) Notice: Subject to any disclaimer, the term of this patent is extended or adjusted under 35 U.S.C. 154(b) by 1225 days.

(21) Appl. No.: 12/867,819

(22) PCT Filed: Feb. 16, 2009

(86) PCT No.: PCT/GB2009/050144
§ 371 (c)(1),
(2), (4) Date: Sep. 21, 2010

(87) PCT Pub. No.: WO2009/101447
PCT Pub. Date: Aug. 20, 2009

(65) Prior Publication Data
US 2011/0018854 A1    Jan. 27, 2011

Related U.S. Application Data

(63) Continuation-in-part of application No. 12/138,992, filed on Jun. 13, 2008, now abandoned.

(30) Foreign Application Priority Data

Feb. 15, 2008   (GB) .................................. 0802819.3

(51) Int. Cl.
*G06F 15/177*   (2006.01)
*G06F 11/14*   (2006.01)
*G06F 1/32*   (2006.01)
(Continued)

(52) U.S. Cl.
CPC .............. *G06F 1/3203* (2013.01); *G06F 3/048* (2013.01); *G06F 1/3218* (2013.01); *G06F 1/30* (2013.01); *G06F 15/177* (2013.01); *G06F 1/3265* (2013.01); *G06F 1/3287* (2013.01);
(Continued)

(58) Field of Classification Search
CPC combination set(s) only.
See application file for complete search history.

(56) References Cited

U.S. PATENT DOCUMENTS 4,907,183 A * 3/1990 Tanaka .......................... 713/340
5,410,713 A * 4/1995 White et al. .................. 713/330
(Continued)

OTHER PUBLICATIONS

PCT International Preliminary Report on Patentability, Written Opinion; PCT/GB2009/050144; D. Mulhausen; Aug. 17, 2010.
(Continued)

*Primary Examiner* — Claire X Pappas
*Assistant Examiner* — Scott Trandai
(74) *Attorney, Agent, or Firm* — Fish & Richardson P.C.

(57) ABSTRACT

We describe power control techniques for an document reader with an electrophoretic display. In embodiments the document reader comprises a main processor to display information and at least one secondary processor to detect, say, a user input gesture; a battery to provide power to both processors; and a controllable switch coupled between said battery and said main processor and having a control line coupled to said secondary processor, to switch power from said battery to said main processor while said secondary processor is powered. In embodiments a power consumption measured in months is desired so that rather than put the main processor into a standby mode power to the main processor is switched off entirely but the system is arranged to be able to start-up quickly from this configuration.

12 Claims, 4 Drawing Sheets

(51) Int. Cl.
  *G06F 3/048*  (2013.01)
  *G06F 1/30*  (2006.01)
  *G09G 3/34*  (2006.01)
  *H04N 1/00*  (2006.01)

(52) U.S. Cl.
  CPC .......... *G09G 3/344* (2013.01); *H04N 1/00129* (2013.01); *G09G 2330/026* (2013.01)
  USPC ............ 345/211; 345/184; 713/330; 713/340

(56) References Cited

U.S. PATENT DOCUMENTS

2004/0257898 A1  12/2004  Ozawa et al.
2006/0026521 A1  2/2006  Hotelling
2007/0028086 A1*  2/2007  Oshima et al. .................... 713/1
2008/0259057 A1*  10/2008  Brons ........................... 345/184
2009/0040399 A1*  2/2009  Kao et al. ...................... 348/840

OTHER PUBLICATIONS

International Search Report; PCT/GB2009/050144; Dec. 14, 2009; H. Leineweber.
Ishikawa M. et al.; "A 4500 MIPS/W, 86 MUA Resume-Standby, 11 MUA Ultra-Standby Application Processor for 3G Cellular Phones"; IEICE Transactions on Electronics, Electronics Society, Tokyo, JP; Apr. 1, 2005; vol. E88-C, No. 4; pp. 528-535.
Kamei, T. et al.; 18.6—A Resume-Standby Application Processor for 3G Cellular Phones; Solid-State Circuits conference, 2004; IEEE International, IEEE, Piscataway, NJ; pp. 336-345.
Written Opinion of the International Searching Authority; PCT/GB2009/050144; H. Leineweber.

* cited by examiner

| 100 | FRONT PANEL | |
|---|---|---|
| 102 | MOISTURE BARRIER | |
| 104 | ELECTROPHORETIC DISPLAY | |
| 106 | ORGANIC ACTIVE MATRIX PIXEL DRIVER CIRCUITRY | 112 |
| 108 | SUBSTRATE | |
| 110 | MOISTURE BARRIER | |

ELECTRONIC DOCUMENT READING DEVICE

FIELD OF THE INVENTION

This invention relates to electronic document reading devices, and more particularly to architectures for such devices to reduce power consumption, and to related methods.

BACKGROUND TO THE INVENTION

We have previously described a form of electronic book in our earlier applications PCT/GB2006/050235 and GB 0702347.6, hereby incorporated by reference.

Background prior art relating to electronic document reading devices can be found in U.S. Pat. No. 6,124,851, US2004/0201633, US2006/0133664, US2006/0125802, US2006/0139308, US2006/0077190, US2005/0260551, U.S. Pat. No. 6,124,851, U.S. Pat. No. 6,021,306, US2005/0151742, and US2006/0119615. Examples of electronic document reading devices are the Iliad Ilex®, the Amazon Kindle® and the Sony® Reader. Further background prior art can be found in: US2007/0028086, US2007/0115258, and U.S. Pat. No. 7,058,829.

An electronic document reading device with a non-volatile, in particular electrophoretic display can potentially offer reduced power consumption since power may be removed from the display whilst retaining a displayed image of a page or the like. However there remains a need to reduce the overall power consumption of such a device.

SUMMARY OF THE INVENTION

According to a first aspect of the invention there is therefore provided an electronic document reading device with an electrophoretic display, the electronic document reading device comprising: a main processor to control display of information on said display; and a secondary processor to process data from one or more user input devices, said secondary processor being coupled to said main processor; a battery to provide power to said main processor and to said secondary processor; and a first controllable switch coupled between said battery and said main processor and having a control line coupled to said secondary processor, said first controllable switch being configured to switch power from said battery to said main processor whilst said secondary processor is powered; and wherein, in an operational mode; said secondary processor is configured to detect a user input and, responsive to said detection, to control said switch to turn on a power supply from said battery to said main processor; said main processor is configured to perform a cold boot responsive to said turning on of said power and then to perform an action in accordance with said detected user input, and wherein said electronic document reading device is configured to control said controllable switch to turn off said power supply to said main processor after said action has been performed.

In embodiments of the device the power to the main processor is entirely removed since it is been found experimentally that even leakage current through the processor can be an unacceptable power drain in a system for which a power consumption measured in months is desired. Thus when at least one of the secondary processors detects user input, for example a gesture, the main processor is turned on and performs a cold boot, performs an action in accordance with the detected user input and then turns off its power supply after the action has been performed. In preferred embodiments the system is arranged to be able to start-up quickly from this configuration to enable a fast response to user commands, as described in more detail below. The skilled person will understand that in general the processors will be configured to perform their various functions by way of processor control code stored in non-volatile RAM or ROM.

In some preferred implementations of the reading device the display driver has associated memory which includes a memory to store data representing a current state of the electrophoretic display, to track a current state of the display even when the device is switched off. In some preferred implementations this memory is implemented as low power DRAM (Dynamic Random Access Memory), for example of the type used in mobile phones.

The skilled person will understand that the memory associated with the display driver may physically be configured in a number of different ways provided that at least part of the memory (the part storing data representing a current state of the electrophoretic display) has a separately switchable power supply. In embodiments in the display memory comprise separately powered blocks of memory within a single, contiguous memory space.

Some preferred embodiments of the power management architecture include a further controllable switch coupled between the battery and the first controllable switch. This further (main) controllable switch in embodiments switches power to the secondary processor and to the memory associated with a display driver, more particularly to the part of the memory storing data representing a current state of the electrophoretic display. This switch may be employed to implement one or more of a number of functions including a "battery save" function. In embodiments, the main processor controls the further switch (optionally via the secondary processor) to switch the entire device off in the event that a rechargeable battery powering the device is in danger of being damaged by becoming over-discharged. The further controllable switch may be controlled ON in response to detection of a connection to a USB (Universal Serial Bus) at a port of the device, by detecting a power input at the USB port (depending upon the configuration of the power supply to the secondary processor, optionally via the secondary processor). The further controllable switch may also be controlled ON, for example, by (wired or wireless) connection of a battery charger. It will be appreciated that the further controllable switch may be controlled in a variety of different ways.

In some preferred embodiments of the device the secondary processor is configured to inform the main processor of the reason for this processor being started up when power is applied to the main processor so that it performs its cold boot. More particularly the secondary processor informs the main processor when the device is to perform an ab initio start up of the device, initialising memory, the operating system and various system components, and when the main processor is to perform an alternative cold boot process. In the latter case, data provided by the secondary processor instructs the main processor to perform a user-requested action or other cold boot wake-up such as a USB wake-up or Bluetooth® wake-up. Thus in embodiments of the system at least two different forms of cold boot are implemented by the main processor, depending upon the previous state or use of the device when the main processor is cold booted.

In embodiments different actions are performed by separately loadable computer program code modules, selectively loaded following said cold boot. In general, a user-requested action such as a page turn action will cause the main processor to load only a limited portion of the operating environment of the device whereas other types of cold boot may cause the main processor to load up more of the operating system, optionally substantially the complete operating system, and/or to initialise a communication procedure with an external document supplying computer system.

In embodiments of the device when the main processor is shut down, for example after a timeout, the power is removed from the main processor after prior notification and waiting for the main processor to enter a state in which it is ready to be powered down. In particular the processor is shut down when it is no longer writing to Flash memory or performing another background function such as rendering.

Preferably the one or more user input devices include one or more further processors, each coupled to the secondary processor, to receive and process data from a plurality of touch sensors on the device, for example arranged around the perimeter of the display. In preferred embodiments such a further processor is responsive to a gesture made on the touch sensitive part of the device. Thus in embodiments the further processor comprises a gesture processor which interprets a gesture and provides gesture interpretation data to the secondary processor, for control of the device. In embodiments the gesture includes at least a page turn gesture.

In embodiments on receipt of a touch, more particularly gesture, input the secondary processor controls the main processor to perform a cold boot with a limited portion of the operating environment such that the cold boot is performed very rapidly, preferably less than one second, more preferably less than 500 ms or less than 200 ms. The main processor then identifies (in this example), a next page to display and loads image data for a part or all of the page from non-volatile memory (for example Flash memory) for display on the non-volatile display. Storing the page data as an image substantially reduces the amount of processing required and, in embodiments.

In embodiments the information for display is written to the memory associated with the display driver, as described above. Once the information is displayed on the electrophoretic display, and after the part of the memory storing data representing a current state of the electrophoretic display has been updated, because the display is permanent and because the current state of the electrophoretic display has been stored, power to the entire main processing system including the display power supply and driver (but not the part of the memory storing data representing a current state of the electrophoretic display) can be switched off by control of the first controllable switch. In embodiments this switch is controlled by the secondary processor and may be switched off, for example, after delaying for a period in case there are any further user gestures or actions input. In embodiments the current display state may be saved in non-volatile memory rather than in powered DRAM, in which case power may be switched off to all the display driver's memory.

The skilled person will appreciate that embodiments of the device are thus able to provide a combination of both extremely low power—for example, a battery lifetime measured in months—and a fast response to user commands.

In a related aspect the invention provides an electronic document reading device having a non-volatile display, the device comprising: a battery to provide power for said electronic document reading device, a main processor for controlling display of information on said device; a display controller coupled to said main processor and to said non-volatile display; volatile display memory coupled to one or both of said main processor and said display controller, said display memory being configured as a plurality of memory blocks, at least one of said memory blocks for storing data representing a state of said electrophoretic display; a secondary processor to provide a user interface to said device; a first controllable switch connected for control by said secondary processor, to switch power from said battery to said main processor, to said display controller and to said display memory; a second controllable switch coupled in series between said battery and said first controllable switch; and wherein said secondary processor and said at least one memory block for storing said data representing a state of said electrophoretic display are configured to be powered from a connection between said first and second controllable switches.

The invention further provides a method of operating an electronic document reading device with a non-volatile display, the method comprising: using a secondary processor to detect a touch sensor input from a user of said device, said touch sensor input identifying an action said user wishes the device to perform; controlling, using said secondary processor, a power supply to a main processor of said device from an off state in which all power is removed from said main processor to a state in which power is applied to said main processor, in response to said touch sensor input detection; allowing said main processor to perform said action; and then controlling said power supply to said main processor back to said off state to remove all power from said main processor.

In embodiments of the method, in particular where a rechargeable battery is employed, a power supply to the entire device, including the secondary processor may be switched off in response to a detected state of the battery. The secondary processor may, when power is reapplied, determine that this has taken place and then instruct or provide data to the main processor to perform a different type of cold boot from that employed when power to the secondary processor has been maintained, in particular to perform initialisation of the document reading device.

Features of the above described aspects and embodiments of the invention may be combined in any combination.

BRIEF DESCRIPTION OF THE DRAWINGS

These and other aspects of the invention will now be further described by way of example only, with reference to the accompanying figures in which:

FIGS. 3a and 3b show, respectively, a block diagram of a power management system for electronic document reading device according to an embodiment of the invention, and a flow diagram of a cold boot procedure employed by the power management system of FIG. 3a.

DETAILED DESCRIPTION OF PREFERRED EMBODIMENTS

Figure 1A:
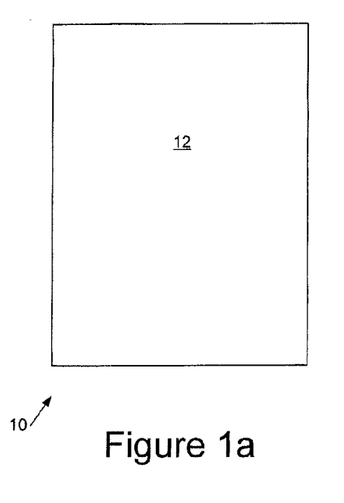
FIGS. 1a to 1c show, respectively, a front, display face view, a rear view, and a vertical cross-section view of an electronic document reading device.
Figure 1B:
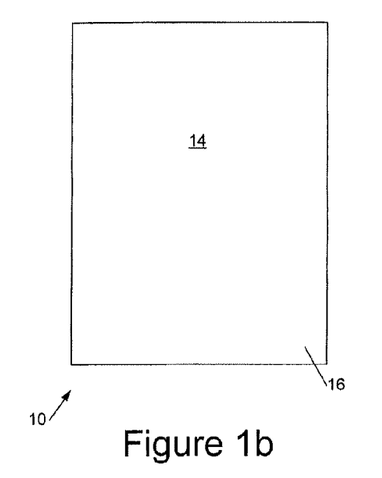
Figure 1C:
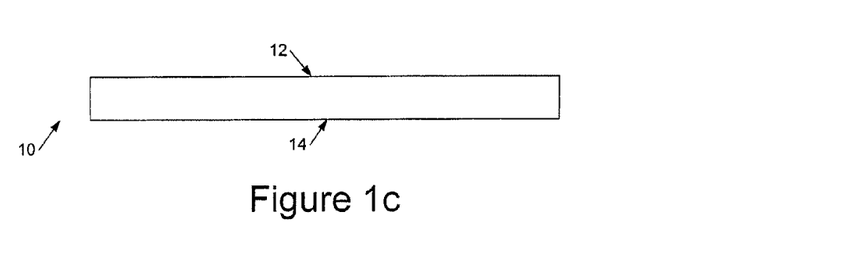

Referring to FIGS. 1a to 1c, these schematically illustrate an electronic document reading device 10 having a front display face 12 and a rear face 14. As can be seen from FIG. 1c, in preferred embodiments the display surface 12 is substantially flat to the edges of the device and, in particular, lacks a display bezel. However in embodiments described later it will be seen that the electronic (electrophoretic) display does not extend right to the edges of the display surface 12, and rigid control electronics are incorporated around the edges of the electronic display, this approach reducing the overall thickness of the device and thus facilitating flex-tolerance, at the expense of making the overall area of the device slightly larger.

Figure 2A:
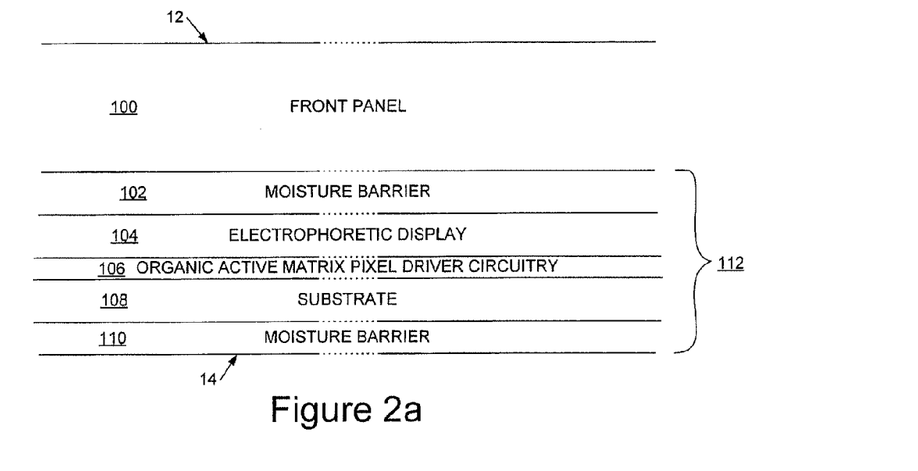
FIGS. 2a to 2c show, respectively, a detailed vertical cross-section through a display portion of the device of FIG. 1, a device having a border comprising touch sensitive elements, and a cross section through the edge of the device for FIG. 2b.

Referring now to FIG. 2, this illustrates a vertical cross-section through a display region of the device between the frame members 16. The drawing is not to scale.

As can be seen, in preferred embodiments the device has a substantially transparent front panel 100, for example made of Perspex®, which acts as a structural member. The active matrix pixel driver circuitry layer 106 may comprise an array of organic or inorganic thin film transistors as disclosed, for example, in WO01/47045. Such a front panel is not necessary and sufficient physical stiffness could be provided, for example, by the substrate 108 optionally in combination with one or both of the moisture barriers 102, 110.

The illustrated example of the structure comprises a substrate 108, typically of plastic such as PET (polyethylene terephthalate) on which is fabricated a thin layer 106 of organic active matrix pixel driver circuitry. Attached over this, for example by adhesive, is an electrophoretic display 104, although alternative display media such as an organic LED display medium or liquid-crystal display medium may also be used. A moisture barrier 102 is provided over the electronic display 104, for example of polyethylene and/or Aclar™, a fluoropolymer (polychlorotrifluoroethylene-PCTFE). A moisture barrier 110 is also preferably provided under substrate 108; since this moisture barrier does not need to be transparent preferably moisture barrier 110 incorporates a metallic moisture barrier such as a layer of aluminium foil. This allows the moisture barrier to be thinner, hence enhancing overall flexibility.

Approximate example thicknesses for the layers are as follows: 100 μm for moisture barrier 110, 200 μm for substrate 108, 5-6 μm for active layer 106, 190 μm for display 104, and 200 μm for moisture barrier 102. The set of layers 102-110 form an encapsulated electronic display 112; preferably this is bonded, for example by adhesive, to a transparent display panel 100. The front panel 100 may have a thickness in the range 0.5-2 mm, for example approximately 1 mm.

Surprisingly it has been found that the presence of the front panel 100 has little effect on the overall visual appearance of the display, in particular the contrast ratio. It is speculated that this is because although whites become slightly greyer, black becomes slightly blacker.

In embodiments, the electronic document reader comprises connectors located along an edge of the device to enable the device to be connected to other electronic devices, such as a laptop or desktop computer, a PDA (Personal Digital Assistant), a mobile phone or 'smart' phone, or other such devices. A USB (universal serial bus) or similar connector is, for example, provided. However, in embodiments, the electronic document reader may additionally or alternatively be provided with wireless interfaces (for example a infrared or Bluetooth™ or other such interfaces). Such connections enable documents to be transferred to and from the electronic document reader.

The device may also include a number of user controls for selecting documents and/or pages, turning pages forward and back and the like. In embodiments, the border around the active display comprises touch sensitive elements as shown for example in FIG. 2b. However in other embodiments the display may be touch sensitive, for example as described in our co-pending international patent application PCT/GB2006/050220 hereby incorporated by reference in its entirety. Such sensors may include capacitive sensors or resistive touch sensors. The aforementioned patent application describes an arrangement in which a touch-screen component is positioned below the display, but which is nonetheless operable from the front, display surface, in particular by laminating the display medium and display backplane over a resistive touch-screen (using a pressure sensitive adhesive). However the skilled person will appreciate that other forms of touch-screen technology may additionally or alternatively be employed. In such embodiments, documents may be electronically "marked-up", with mark-up data being written to or being associated with the electronic document being displayed.

Figure 2B:
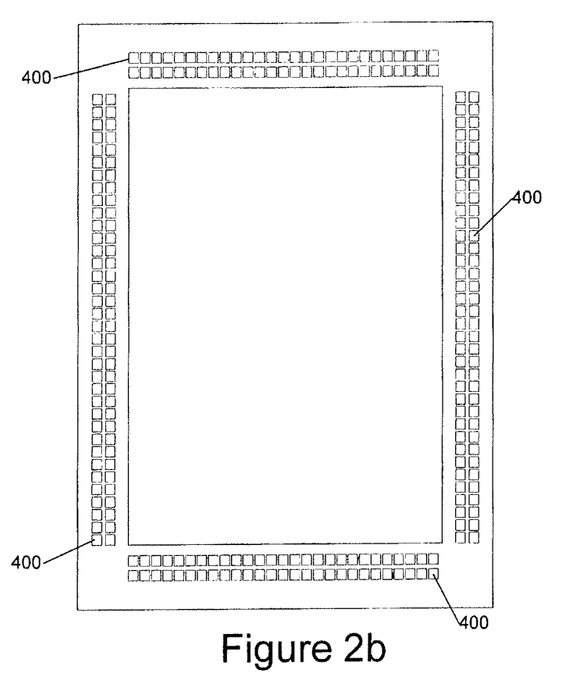

As mentioned above, embodiments may have a border comprising touch sensitive elements 400, as shown for example in FIG. 2b. Such elements may provide a number of user controls for selecting documents and/or pages, turning pages forward and back and the like. The touch sensitive elements may be arranged around one or more of the borders of the device. The touch sensors may be arranged such that location agnostic gestures are enabled, wherein a user may perform the same gesture at any point around the border to produce the same result, is particular independent of orientation (portrait or landscape) of the device.

Figure 2C:
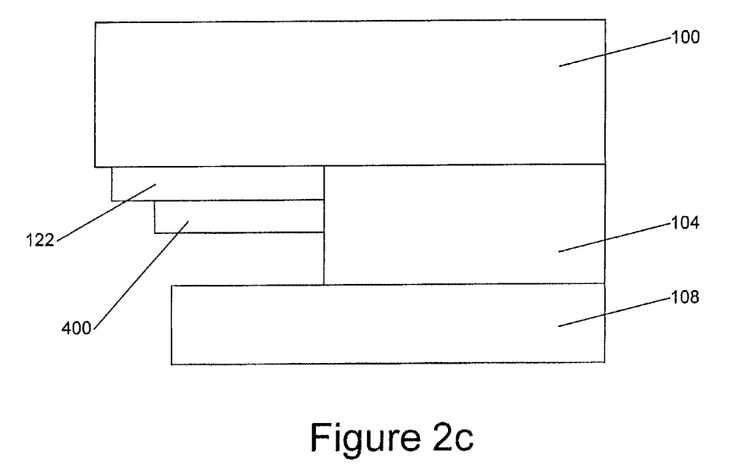

FIG. 2c shows a cross section through the edge of a device. To form such touch sensors, a conductive layer 400 of the touch sensor is patterned on the underside of the border 122. The upper conductive layer is patterned to produce a sensor array, which is formed of a design so as to enable touch sensitive gestures to be provided, both in a horizontal and vertical direction. The upper conductive layer may be a conductive polymer or preferably a metallic layer, such as, but not limited to copper, nickel, gold or silver or alternatively a printable metal. The conductive layer maybe deposited using techniques such as vacuum deposition, electroplating and printing techniques, such as screen printing.

An insulator material layer is then deposited over the upper conductive layer, by techniques such as but not limited to, spray or blade coating or printing techniques. A lower conductive layer is then deposited over the dielectric layer and patterned, as above. The lower conductive layer forms the ground plane and may also form the tracking plane. Alternatively, a separate conductive layer may be deposited and patterned as above to form the tracking plane, separated from the adjacent conductive layer by a further layer of dielectric material.

Via hole interconnects are formed between the sensor array and the tracking plane, in order to connect these two layers electrically. The tracking plane is then in turn connected to the electronics of the device. There are several ways that the connection may be formed between the upper conductive layer and the electronics of the device. Such connections may be formed mechanically, with the aid of an adhesive or through a welding process.

As mentioned above, in preferred embodiments the display medium is a reflective display medium, in particular an electrophoretic display medium and the backplane comprises a flexible substrate such as PET or PEN (polyethylene naphthalene). Preferably the backplane is fabricated using solution-based transistors preferably patterned by techniques such as direct-write printing, laser ablation or photolithography. Further details can be found in the applicant's earlier patent applications, including, in particular, WO 01/47045, WO 2004/070466, WO 01/47043, WO 2006/059162, WO 2006/056808, WO 2006/061658, WO 2006/106365 and PCT/GB2006/050265, all hereby incorporated by reference in their entirety.

Power Supply Management

Figure 3A:
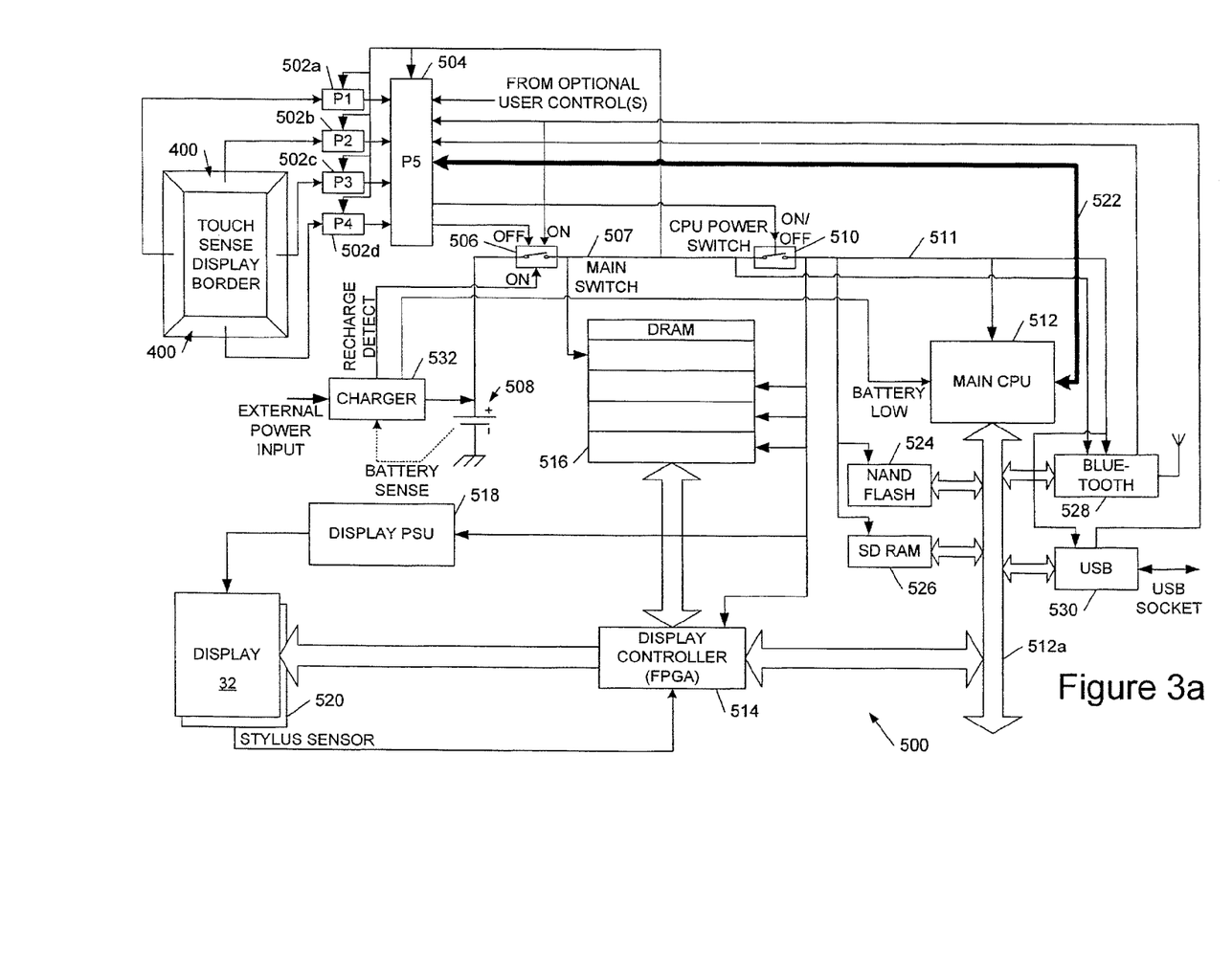

Referring now to FIG. 3a, this shows the embodiment of a power management architecture 500 for an electronic document reading device incorporating an electrophoretic display 32.

The electronic document reading device includes one or more user input devices for receiving user control commands; these may comprise one or more conventional buttons or switches but in preferred embodiments the display is provided with a touch sensitive border 400, as previously described. This enables the user to control the device through touch and/or gesture; in embodiments no power on/off switch or control is needed. In preferred embodiments data from the touch sensitive border is processed by one or more dedicated processors 502a-d, in embodiments PSoC® microcontroller devices available for example from Cypress Semiconductor Corporation. Each of these provides an input to a further processor 504, in embodiments an AVRmega48 device from Atmel (Registered Trade Mark) Corp, which includes on-chip Flash, RAM, and EEPROM. Processor 504 processes data from the touch sensitive part of the display and provides control information to a main CPU (Central Processing Unit) 512 of the electronic document reading device via a bi-directional serial bus US522. Processor 504 also provides a number of power control functions, as described in more detail later.

Power for the electronic document reading device is provided from a rechargeable battery 508, for example a 3 volt lithium battery, via a main switch 506 which switches power on and off to the entire device. The switch 506 has at least one control input for controlling the switch on and off and in embodiments comprises a low-on-resistance CMOS switch, more generally a solid state switch such as a MOS-FET switch. A first power supply bus 507 provides the switched power from the main switch a secondary, CPU power switch 510, again comprising a controllable CMOS switch, which in turn provides power to a second, switched power bus 511.

The electronic document reading device includes a main CPU 512, for example an ARM (Registered Trade Mark) device having a bus 512a coupling the device to NAND Flash 524, SD RAM 526, a Bluetooth interface 528, and a USB interface 530 as well as, optionally, to other peripheral devices. bus 512a also couples the main CPU 512 to a display controller at 514, for example implemented as an FPGA (Field Programmable Gate Array) or ASIC (Application Specific Integrated Circuit), which in turn drives display 32. In embodiments the CPU and display controller are implemented on a single chip for example using a customisable microcontroller such as an Atmel CAP 9 series, the display controller being implemented using an on-chip programmable block. In the illustrated example, a pressure sensitive sheet 520 (optional) is provided behind display 32 to enable a user to write on the display with a stylus; in the illustrated embodiment pressure sheet 520 provides an input to display controller 514 which processes this data and provides it to the main CPU 512. The display 32 has a dedicated display power supply unit 518 to provide the relatively high voltages used to drive the electrophoretic display from the battery 508; these may be of order tens of volts. In the illustrated embodiment the display controller 514 is coupled to dynamic RAM 516 comprising blocks of memory at least one of which has its own, separate power supply. The DRAM 516 stores data for display controller 514 and has a portion for storing data representing a current state of the electrophoretic display which has a separately switchable power supply; memory 516 may physically comprise either a single memory device or multiple separate memory devices.

In FIG. 3a power supply rails are shown with triangular arrow heads and signal/control lines are shown using arrow heads with a slightly indented rear. Thus it can be seen that power bus 511, as well as providing a power to the main CPU 512, also provides a power supply to memory elements 524, 526, peripheral devices 528, 530, to the display controller 514 and display power supply 518, and to part of the display memory 516 not including the portion for storing data representing a current state of the electrophoretic display. The main power supply bus 507 provides power to the portion of memory storing data representing a current state of the electrophoretic display, to processors 502a-d and processor 504 (which provide touch-sense and power management functions). This power supply bus also provides a second power supply to Bluetooth interface 528. A charger 532 has a wired or wireless external power input and operates to charge battery 508, as well as providing a battery status sense function and a low battery output signal to the main CPU 512 (in other embodiments such a battery status sense function may be provided in different ways). The charger 523 also provides a recharge detect signal, as illustrated to main switch 506, but in other embodiments this may be configured differently, for example to provide a signal to process 504.

Broadly speaking, in operation processor 504 controls the CPU power switch 510 to switch on and off power to the main CPU, the CPU memory and peripherals, the display RAM, display controller and display power supply only when it is needed for example in response to a user request for a page term. The inventors have ascertained that merely operating the main CPU 512 in a reduced power, standby state is not sufficient to provide the desired battery life, which is preferably of order months, since even the leakage current through the CPU is unacceptably high. Thus rather than put the main CPU 512 into a standby state, the power supply is entirely removed from the CPU and from as many of its associated elements as possible. However, to enable the system to drive the electrophoretic display 32 when it restarts a power supply is maintained to the part of DRAM 516 storing data representing a current state of the electrophoretic display, this part of the memory maintaining a record of the state of each pixel of the electrophoretic display.

Although it is preferable to store the current state of each pixel in memory which retains this data even when power to the CPU 512 is removed this is not essential because, for example, when the main CPU 512 starts up it could reset the entire display to a known state, for example all black or all white. However, because power to the entire CPU is turned off, when the power is re-applied the main CPU by definition performs a cold boot which is potentially a slow process. It is therefore preferable to minimise the delay between re-applying power to the CPU and performing the desired user action, and storing a current state for each pixel of the display helps to achieve this. When the desired user action has been performed, because the processor performs a cold boot in response to the user action, if desired the power to the CPU can simply be removed without prior notification to the CPU—that is a handshaking process requesting power down and having the CPU acknowledged that a power down can take place is, in embodiments, not necessary.

In the illustrated embodiment, elements of the system which are not powered down by the CPU power switch 510 are the secondary processor 504 (since this controls switching on and off of switch 510) and where (as in preferred embodiments) the electronic document reading devices touch/gesture sensitive, power is also maintained to the touch/gesture processors 502 so that the document reading device remains sensitive to a user touch/gesture when the main CPU is switched off. Alternatively, however, processor 504 may have one or more inputs from buttons or switches on the device to enable the main CPU to be restarted.

When the CPU power switch 510 is off preferably power is still applied to the Bluetooth® interface 528 so that, in embodiments, the Bluetooth® system has two power supplies, one to power the main Bluetooth system and a second, derived from bus 507, to provide a minimal amount of power to the Bluetooth system to provide a Bluetooth 'sniffing' function powering on a receiver at intervals to check whether a Bluetooth-compatible signal is locally present. The Bluetooth system 528 provides a signal to processor 504 when a Bluetooth compatible RF signal is detected and processor 504 can then control switch 510 to switch the main CPU on. In this way the device can be configured to automatically power up and connect to a Bluetooth network when one is present, (for example to perform automatic synchronisation when the device is brought into proximity with a Bluetooth-enabled host computer system.

Preferred embodiments of the electronic document reading device also include a main switch 506 configured to switch power on and off to the entire document reading device, including the part of the memory storing data representing a current state of the electrophoretic display, and the processor 504. In embodiments this is used to switch off power to the entire device in response to detection that the battery 508 is low (this could happen after many months of use without recharging). The skilled person will understand that there are many different possible signal routes which could be employed—as illustrated with the charger 532 senses a condition of the battery and provides a signal to the main CPU 512 which either directly, or via processor 504, controls the main switch 506 off. However in other arrangements a charger 532 could directly control the main switch 506 off, or this control could be performed via a loop including processor 504 but not main CPU 512. The main switch 506 may be switched on, for example, by detection of recharging of the electronic document reading device and/or by a USB power detect function provided by USB interface 530 which detects when power is available from the connected USB socket. In embodiments this power source may additionally or alternatively be employed to recharge battery 508.

Figure 3B:
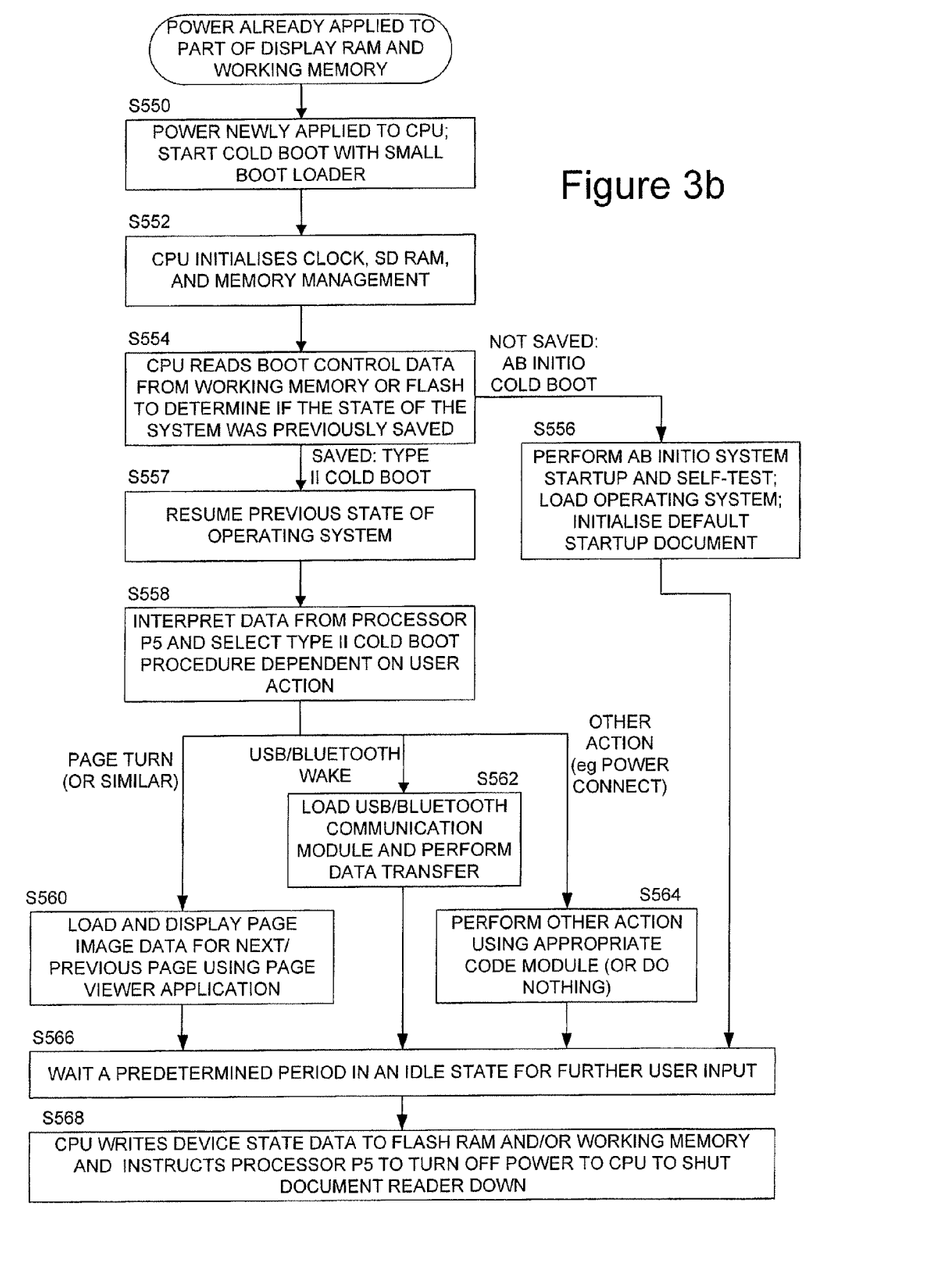

Referring now to FIG. 3b, this shows a flow diagram of a cold boot procedure employed by the power management architecture of FIG. 3a. The procedure begins with no power at all applied to the CPU so that with power applied to part of the display memory (the part of the memory storing data representing a current state of the electrophoretic display) and, preferably at least part of the working memory. This part of the working memory preferably stores parameters for the operating system and/or part or all of the operating system itself.

At step S550 power is applied to CPU 512 and the cold boot process begins, the CPU initialising the system clock (not shown in FIG. 3a for clarity), the SDRAM 526, the memory management and other elements of the system. The CPU 512 then reads boot control data from the working memory or Flash to determine whether booting is in response to a particular user action and hence whether there is a previously saved state of the system or whether the system is performing an ab initio start up of a type employed when main switch 506 is switched on (step S554). If the system is performing an ab initio cold boot then, at step S556 the system performs an ab initio start up including a self test, initialising the status of any stored documents, checking for software updates and the like. The procedure then continues to step S566, to await a user command. In preferred embodiments the ab initio boot procedure is used only when the device is first ever powered on or after an exception procedure, in particular when the battery has become discharged, reserving power entirely from the device, or in response to user operation of a (hidden) reset control.

At step S557, in embodiments where power is maintained to the working memory (SDRAM), then the state of the device at previous shut-down may be resumed by trading device state data from the working memory. This device state data may comprise one or more of register settings, operating system parameters and the operating system itself. Where power is not maintained to the working memory, this data may be retrieved from the Flash memory.

If the CPU 512 is performing a second type of cold boot, that is in response to a user action (which may include a connection to a USB interface or Bluetooth network) then at step S558 main CPU 512 selects a cold boot procedure dependent on the user action and determines whether the desired action can be performed with only a limited portion of the operating system, which is desirable, if possible, for speed of response. A preferred operating system is Windows CE®. If the main CPU 512 was switched on in response to a page turn or similar page manipulation gesture then, at step 560, the main CPU loads the relevant page data from flash memory 524 and provides this to display controller 514 for display on electrophoretic display 32. In preferred embodiments this page data is stored in flash memory 524 in the form of image data which can be written to the display via the display controller without substantial further processing.

In general a page manipulation function may be performed by loading (only) a specific application to perform the desired function. In general in embodiments of the systems different functions of the device are performed by different applications which may be selectively loaded as required (by the user command causing the device to start up). In this way the effect of latency of a cold boot start prior to performing a user-specified action may be reduced. A similar procedure is performed at step S564 in response to other user actions, for example connecting power to the device after which it may simply wait for further user input.

If the cold boot of main CPU 512 was performed in response to a USB or Bluetooth wake signal then, step S562, in embodiments a USB or Bluetooth communications module is loaded and a data transfer procedure is started, typically to retrieve one or more documents or portions of documents from another computing device, for example a desktop or laptop computer system, PDA, mobile phone or any other type of processor-driven device. Optionally the synchronisation may include sending data back to the other computing device, for example annotation data for a displayed page captured by stylus sensor 520.

Once the main CPU has been turned on it preferably waits for a period in an idle state for any further user input/commands (S566). This helps to improve the user experience by reducing the number of cold boot start-ups where, for example, a user is performing a sequence of actions. If no further user input is received then, at step S568, the CPU 512 instructs processor 504 to turn off power to the CPU 512, to shut the document reader down. Prior to powering off the CPU the system writes the aforementioned device state data to the working memory (if power to this is being maintained) and/or to the Flash memory, thus performing a controlled shut-down.

The skilled person will understand that an electronic document reading device, with which embodiments of the invention may advantageously be employed, may optionally be used for writing as well as reading, for example to annotate a page which is being read. A displayed document may include, for example, pictures, music and in general any material which may be printed to a page.

No doubt many other effective alternatives will occur to the skilled person. It will be understood that the invention is not limited to the described embodiments and encompasses modifications apparent to those skilled in the art lying within the spirit and scope of the claims appended hereto.

The invention claimed is:

1. An electronic document reading device with an electrophoretic display, the electronic document reading device comprising:
   a main processor to control display of information on said display; and
   a secondary processor to process data from one or more user input devices, said secondary processor being coupled to said main processor;
   a battery to provide power to said main processor and to said secondary processor; and
   a first controllable switch coupled between said battery and said main processor and having a control line coupled to said secondary processor, said first controllable switch being configured to switch power from said battery to said main processor whilst said secondary processor is powered;
   a display driver for said electrophoretic display, said display driver having associated memory to store data for displaying on said electrophoretic display, wherein said associated memory includes a first portion of the memory to store data representing a current state of the electrophoretic display and a second portion of the memory which does not store data representing the current state of the electrophoretic display;
   a further controllable switch coupled between said battery and said first controllable switch to switch power to said first controllable switch; and
   wherein, in an operational mode:
   said secondary processor is configured to detect a user input and, responsive to said detection, to control said switch to turn on a power supply from said battery to said main processor;
   said main processor is configured to perform a cold boot responsive to said turning on of said power and then to perform an action in accordance with said detected user input, and wherein said electronic document reading device is configured to control said first controllable switch to turn off said power supply to said main processor, said display driver and said second portion of the memory after said action has been performed and to control said further controllable switch to switch off power to said first portion of the memory in response to detection that the battery is low.

2. An electronic document reading device as claimed in claim 1 said further controllable switch is coupled between said battery and said first controllable switch to switch power to said first controllable switch; and wherein said secondary processor is configured to receive power from a junction between said first controllable switch and said further controllable switch.

3. An electronic document reading device as claimed in claim 2 wherein said further controllable switch has a control line coupled to said secondary processor to enable said main processor, via said secondary processor, to turn off said further controllable switch.

4. An electronic document reading device as claimed in claim 1 wherein said further controllable switch is coupled between said battery and said first controllable switch to switch power to said first controllable switch; and wherein said secondary processor and said second portion of said associated memory are configured to receive power from a junction between said first controllable switch and said further controllable switch.

5. An electronic document reading device as claimed in claim 4 wherein said further controllable switch has a control line coupled to said secondary processor to enable said main processor, via said secondary processor, to turn off said further controllable switch.

6. An electronic document reading device as claimed in claim 1 wherein, when said first controllable switch is turned on, said secondary processor is configured to inform said main processor whether said cold boot should comprise an ab initio start-up for said electronic document reading device.

7. An electronic document reading device as claimed in claim 1 wherein said one or more user input devices include at least one further processor, coupled to said secondary processor, to receive and process touch sensor user input.

8. An electronic document reading device as claimed in claim 7 wherein said touch sensor user input includes at least a page turn gesture, and wherein said action performed by said main processor in response to said page turn gesture includes loading an image of at least part of a document page from non-volatile memory coupled to said main processor and outputting said image for display on said electrophoretic display.

9. An electronic document reading device as claimed in claim 1 wherein different said actions, selected responsive to said detected user input, are performed by different separately loadable computer program code modules; and wherein said device is configured to selectively load a said code module for performing a selected said action following said cold boot.

10. An electronic document reading device having a non-volatile display, the device comprising:
    a battery to provide power for said electronic document reading device,
    a main processor for controlling display of information on said device;
    a display controller coupled to said main processor and to said non-volatile display;
    volatile display memory coupled to one or both of said main processor and said display controller, said display memory being configured as a plurality of memory blocks, including a first memory block for storing data representing a current state of said electrophoretic display and at least one further memory block which does not store said data representing a current state;
    a secondary processor to provide a user interface to said device;
    a first controllable switch connected for control by said secondary processor, to switch power from said battery to said main processor, to said display controller and to said at least one further memory block of said display memory;
    a second controllable switch coupled in series between said battery and said first controllable switch;
    wherein said secondary processor and said first memory block are configured to be powered from a connection between said first and second controllable switches; and
    wherein said second controllable switch switches off power to said first memory block in response to detection that the battery is low.

11. A method of operating an electronic document reading device with a non-volatile display, a display driver to drive said display and memory to store data for displaying on said display, said memory associated with said driver and comprising a first portion of the memory to store data representing a current state of the electrophoretic display and a second portion of the memory which does not store data representing the current state of the electrophoretic display;

the method comprising:

using a secondary processor to detect a touch sensor input from a user of said device, said touch sensor input identifying an action said user wishes the device to perform;

controlling, using said secondary processor and a first controllable switch, a power supply to a main processor of said device from an off state in which all power is removed from said main processor, said display driver and said second portion of said memory to a state in which power is applied to said main processor, said display driver and said second portion of said memory, in response to said touch sensor input detection;

allowing said main processor to perform said action; and then controlling said power supply to said main processor, said display driver and said second portion of said memory back to said off state to remove all power from said main processor, said display driver and said second portion of said memory; and controlling, using a second controllable switch, said power supply to said first portion of said memory.

12. A method as claimed in claim 11 wherein said power supply derives from a rechargeable battery, the method further comprising:

switching off a power supply, using said second controllable switch, to said entire device responsive to a detected state of said battery;

providing information to said main processor from said secondary processor to enable said main processor to determine, when said main processor is started from said off state, if said device is starting from a state in which said power supply to said entire device was switched off.

* * * * *